United States Patent
Eiselt et al.

(10) Patent No.: US 9,294,192 B2
(45) Date of Patent: Mar. 22, 2016

(54) METHOD, SYSTEM, AND TRANSCEIVER DEVICE FOR BI-DIRECTIONALLY TRANSMITTING DIGITAL OPTICAL SIGNALS OVER AN OPTICAL TRANSMISSION LINK

(71) Applicant: ADVA Optical Networking SE, Meiningen (DE)

(72) Inventors: Michael Eiselt, Kirchheim (DE); Klaus Grobe, Planegg (DE); Jörg-Peter Elbers, Fürstenfeldbruck (DE); Helmut Griesser, Aichach (DE)

(73) Assignee: ADVA Optical Networking SE, Meiningen (DE)

( * ) Notice: Subject to any disclaimer, the term of this patent is extended or adjusted under 35 U.S.C. 154(b) by 34 days.

(21) Appl. No.: 14/329,119

(22) Filed: Jul. 11, 2014

(65) Prior Publication Data

US 2015/0030334 A1   Jan. 29, 2015

(30) Foreign Application Priority Data

Jul. 23, 2013  (EP) .................................. 13003679

(51) Int. Cl.
| | |
|---|---|
| *H04B 10/00* | (2013.01) |
| *H04B 10/2575* | (2013.01) |
| *H04B 10/25* | (2013.01) |
| *H04B 10/516* | (2013.01) |
| *H04J 14/02* | (2006.01) |

(52) U.S. Cl.
CPC ........ *H04B 10/2575* (2013.01); *H04B 10/2503* (2013.01); *H04B 10/5167* (2013.01); *H04J 14/02* (2013.01); *H04J 14/025* (2013.01)

(58) Field of Classification Search
USPC ....................................................... 398/66–72
See application file for complete search history.

(56) References Cited

U.S. PATENT DOCUMENTS

| | | | | |
|---|---|---|---|---|
| 5,448,258 A | * | 9/1995 | Edwards | ............... G09G 3/2011 345/90 |
| 8,606,110 B2 | * | 12/2013 | Rospsha | .......... H04B 10/25754 398/115 |
| 8,897,644 B2 | * | 11/2014 | Sugawa | ................ H04J 3/1694 398/70 |

(Continued)

FOREIGN PATENT DOCUMENTS

WO    2010025767 A1   3/2010

OTHER PUBLICATIONS

Chow et al., Demonstration of Low-Power Bit-Interleaving TDM PON, ECOC Technical Digest, 2012, United States.

(Continued)

*Primary Examiner* — Agustin Bello
(74) *Attorney, Agent, or Firm* — The Culbertson Group, P.C.

(57) ABSTRACT

A method for bi-directionally transmitting digital optical signals over an optical transmission link in which a first optical transmit signal is created according to a first binary digital signal in such a way that the bit information of the first binary digital signal is included in first sections of the symbol interval of the first optical transmit signal. A second optical transmit signal is created by creating an optical wavelength reuse signal using the first optical transmit signal received at the second end of the optical transmission link, the optical wavelength reuse signal being modulated according to a second digital signal in such a way that the bit information of the second digital signal is included in second sections of the symbol interval of the first optical transmit signal received.

15 Claims, 5 Drawing Sheets

(56) References Cited

U.S. PATENT DOCUMENTS

| | | | | |
|---|---|---|---|---|
| 8,953,942 B1* | 2/2015 | Lam | ............ | H04J 14/00 398/68 |
| 9,008,512 B2* | 4/2015 | Nazarathy | ............ | H04B 10/272 398/65 |
| 9,008,513 B2* | 4/2015 | Kim | ............ | H04J 14/0282 398/67 |
| 9,031,411 B2* | 5/2015 | Sung | ............ | H04J 14/0227 398/72 |
| 9,042,728 B2* | 5/2015 | Grobe | ............ | H04B 10/032 398/70 |
| 2011/0236021 A1* | 9/2011 | Presi | ............ | H04B 10/2587 398/67 |
| 2013/0170834 A1* | 7/2013 | Cho | ............ | H04J 14/0278 398/58 |
| 2015/0030334 A1* | 1/2015 | Eiselt | ............ | H04B 10/2575 398/79 |

OTHER PUBLICATIONS

Giorgi et al., WDM-PON based on Self-Seeded OLT and Wavelength Reuse at ONU, OFC/NFOEC Technical Digest, 2013, United States.

\* cited by examiner

METHOD, SYSTEM, AND TRANSCEIVER DEVICE FOR BI-DIRECTIONALLY TRANSMITTING DIGITAL OPTICAL SIGNALS OVER AN OPTICAL TRANSMISSION LINK

TECHNICAL FIELD OF THE INVENTION

The invention relates to systems and methods for bi-directionally transmitting digital optical signals over an optical transmission link as well as to optical transceiver devices for a respective system. The methods and apparatus apply wavelength reuse and can be implemented simply and at low cost.

BACKGROUND OF THE INVENTION

In optical wavelength division multiplex (WDM) passive optical networks, which are commonly applied to realized fiber-to-the home access structures, a plurality of optical network units (ONU) is connected to a central node, also referred to as optical line terminal (OLT), via a remote node (RN). Each ONU connects at least one end-user to the RN. Generally, a single fiber is used for connecting the RN to the ONUs in order to save fiber usage. Using a single-fiber connection between the OLT and the RN further reduces the fiber usage. However, PON configurations with dual-fiber connection between the OLT and the RN are also widely used. Often, a protection mechanism, especially a fiber-protection method and hardware, may be implemented for the transmission link between the OLT and the RN.

PONs enable a bi-directional point-to-point connection between each ONU and the OLT using dedicated optical channels, i.e. for each point-to-point connection a pair of downstream and upstream signals having predetermined optical wavelengths is used. In general, the downstream channel signal transmitted from the OLT to the respective ONU and the upstream channel signal transmitted in the reverse direction may have identical or differing optical wavelengths. The plurality of downstream and upstream optical channel signals is transmitted as a combined WDM signal within the transmission link between the OLT and the RN.

One of the main challenges when deploying this PON technology in access networks arises from the wavelength-assignment problem of WDM transmitters and the costs related therewith. The costs of installation, administration, and maintenance for a PON can be drastically reduced if at least the ONUs reveal a so-called "colorless", i.e. non-wavelength-specific, design. Typical low-cost solutions for colorless ONUs are based on the use of reflective optical transmitters like semiconductor optical amplifiers (RSOA), injection-locked Fabry-Perot laser diodes (IL-FP-LD) or reflective electro-absorption modulators with integrated semiconductor optical amplifiers (REAM-SOA) as optical transmitter components.

In a PON design using such reflective optical transmitters, the downstream (channel) signals are reused in the ONUs in order to create an upstream signal having the same wavelength. Thus, such a system for bi-directionally transmitting digital optical signals over an optical transmission link is referred to as wavelength-reuse transmission systems.

In a WDM-PON with wavelength reuse, the (optical) downstream (channel) signals must not use standard non-return-to-zero (NRZ) on-off keying (OOK) because for levels "0" sent, upstream modulation is impossible or subject to severe penalties. Here and in the following description, a level "0" or a logical value "0" of an amplitude-modulated optical signal shall be understood in such a way that an optical power of essentially zero is transported within the respective symbol interval. Therefore, a modulation format other than NRZ-OOK must be chosen for the downstream signals. However, other modulation formats always involve additional effort and costs.

A known approach for a WDM-PON applying wavelength-reuse is based on using frequency-shift keying (FSK) for the downstream signal, wherein this signal reveals an essentially constant envelope, and a standard OOK modulation format for the upstream signal. Instead of FSK any other modulation format may be used that produces a downstream signal having an essentially constant envelope, like any phase shift keying (FSK) format.

Further, it has been proposed to use an inverse-return-to-zero (IRZ) OOK modulation format for the downstream signal and an RZ OOK modulation format for the related upstream signal.

However, all these solutions require costly components, e.g. FSK demodulators or IRZ/RZ pulse shaping within the ONU, or increase the bandwidth necessary to transmit the downstream or even the downstream and the upstream signals and thus increase the costs for the components necessary to process the respective signals.

SUMMARY OF THE INVENTION

According to the present invention, a first optical transmit signal at a predetermined optical wavelength is created and supplied to a first end of an optical transmission link and transmitted in a first transmission direction to a second end of the optical transmission link. This first optical transmit signal is created in such a way that it can be reused at the second end of the transmission link for creating a second optical transmit signal, preferably by using a reflective modulator device. This second optical transmit signal is transmitted in a second transmission direction to the first end of the optical transmission link. Said first optical transmit signal is created according to a first binary digital signal in such a way that the bit information of the first binary digital signal is included in first sections of the symbol interval of the first optical transmit signal.

Said second optical transmit signal is created by creating an optical wavelength reuse signal using the first optical transmit signal received at the second end of the optical transmission link. The optical wavelength reuse signal is modulated according to a second digital signal in such a way that the bit information of the second digital signal is included in second sections of the symbol interval of the first optical transmit signal received.

According to the invention, a non-return-to-zero (NRZ) signal is used as first binary digital signal and the first optical transmit signal is an optical bit-interleaved seeding signal having a symbol rate equal to the bit rate of the NRZ signal, wherein the symbol interval of the optical bit-interleaved seeding signal is divided into two equally long sub-intervals, the bit information of the first binary digital signal being transported in a first of the two sub-intervals and the second sub-intervals being set to seeding level with respect to the optical power. The seeding level may of course be equal to the maximum (optical) power level of the digital optical bit-interleaved seeding signal.

Thus, no pulse shaping is necessary at the OLT when creating the first optical transmit signal, so that the method can be implemented at low cost.

According to a preferred embodiment, the optical bit-interleaved seeding signal is a duobinary coded optical bit-interleaved seeding signal. Using a duobinary coding leads to a reduction of the bandwidth of the first optical transmit signal that would otherwise be caused by dividing the symbol interval of the first optical transmit signal (and as a result also the second optical transmit signal) into two subintervals and merely using one of the subintervals for the data transmission in each direction. Thus, a decisive reduction of costs for implementing the transmission method is achieved.

The invention is especially applicable for WDM-PON access networks providing bit-rates of 10 Gbit/s for each channel signal in the downstream and upstream direction. Using duobinary coding leads to the effect that the duobinary optical bit-interleaved seeding signal has a bandwidth less than the bandwidth of the first binary digital signal, i.e. in case of a 10 Gbit/s first binary digital signal the bandwidth is less than 10 GHz. This is a clear advantage over the known method of using an IRZ optical channel signal in the downstream direction and an OOK RZ scheme in the upstream direction. The invention requires a Mach-Zehnder modulator (MZM) or a dual electro-absorption modulator (dual EAM) in the OLT for creating the individual channel signals, but reduces the optical (components) bandwidth and enhances the tolerance against chromatic dispersion.

According to an embodiment of the invention, the duobinary optical bit-interleaved seeding signal is created by converting the first binary digital signal into a binary bit-interleaved digital signal having twice the bit rate of the first binary digital signal by dividing each bit interval into two equally long sub-intervals, setting one sub-interval to the signal value of the first binary digital signal and setting the respective other sub-interval to the logical 1 value of the first binary digital signal, pre-coding the first binary digital signal and duobinary encoding the pre-coded binary bit-interleaved digital signal and modulating an optical light source having the predetermined optical wavelength using the pre-coded and encoded binary bit-interleaved digital signal as modulation signal.

Although this is a rather simple method to implement the method according to the invention, it requires hardware that is fast enough to effect the required signal manipulation.

According to another, preferred embodiment of the invention, the duobinary optical bit-interleaved seeding signal is created by pre-coding the first binary digital signal and duobinary encoding the pre-coded first binary digital signal, low-pass filtering the pre-coded and encoded first binary digital signal in such a way that the filtered pre-coded and encoded first binary digital signal assumes in each transition between its extreme values a value which essentially equals the average value of the extreme values at times which essentially are equal to a quarter of the bit interval, and modulating an optical light source having the predetermined optical wavelength using the low-pass filtered pre-coded and encoded first binary digital signal as modulation signal.

With this specific low-pass filtering, the same effect is reached as with the insertion of the additional logical 1 bits as described above. However, no signal manipulation apart from simple low-pass filtering is required.

According to a further embodiment, the duobinary optical bit-interleaved seeding signal may be created in such a way that it is a ternary optical signal with respect to the electric field and a binary digital signal with respect to the optical power. This can be achieved by using an optical modulator device, e.g. a Mach-Zehnder-Modulator or a dual electro-absorption-modulator, which converts the duobinary modulating signal into the duobinary optical bit-interleaved seeding signal in such a way that the extreme values of the ternary modulation signal correspond to +E and −E and the intermediate value of the ternary modulation signal corresponds to 0, wherein +E, 0 and −E designates the amplitude of the electric vector of the optical bit-interleaved seeding signal.

This reduces the intersymbol interference (ISI) as the duobinary coded signal reveals the property that the high bits in high-zero-high sequences of the optical signal reveal a 180 degrees phase shift in the optical frequency that leads to a respective cancellation of overlapping areas of the high bits/pulses due to optical dispersion effects. Thus, the dispersion tolerance of the first optical transmit signal is increased if duobinary encoding is used.

According to an embodiment of the invention, the optical bit-interleaved seeding signal received at the second end of the transmission link is divided, with respect to the optical power of the signal, into an optical receive signal and an optical branch-off signal, and the optical receive signal is used for receiving the first binary digital signal by detecting the optical power during the first of the two equally long sub-intervals, e.g. by using an integrate-and-dump receiver.

Thus, direct detection can be used which reduces the costs of the ONU components as compared to other modulation formats used for the first or downstream optical transmit signal.

The optical branch-off signal can be used to create the optical wavelength reuse signal using a reflective modulator device, e.g. a reflective semiconductor optical amplifier, an injection-locked Fabry-Perot laser diode or a reflective electro-absorption modulator with an integrated semiconductor optical amplifier. This is a simple and cheap method to design a colorless transceiver.

Especially an NRZ or RZ coded signal can be used as second digital signal for creating the second optical transmit signal using the optical bit-interleaved seeding signal so that no complex and/or expensive pulse shaping is required in an ONU which is adapted to implement the method according to the invention.

These and other advantages and features of the invention will be apparent from the following description of illustrative embodiments, considered along with the accompanying drawings.

BRIEF DESCRIPTION OF THE DRAWINGS

In the following, the invention will be described with reference to the embodiments apparent from the drawing.

DESCRIPTION OF ILLUSTRATIVE EMBODIMENTS

Figure 1:
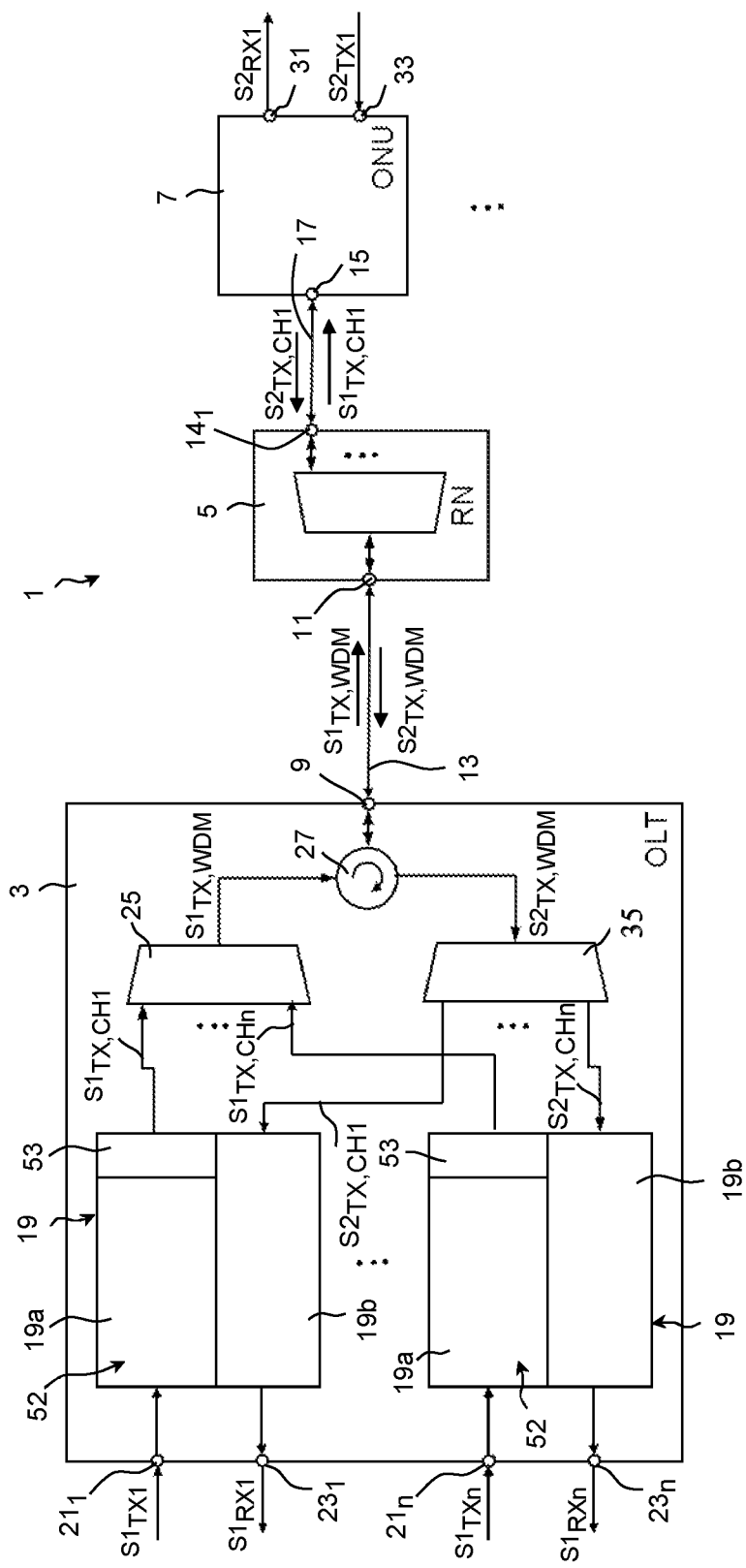
FIG. 1 is a schematic block diagram of a WDM-PON applying the wavelength reuse method according to the invention.

FIG. 1 shows a schematic diagram of a WDM-PON 1 comprising an OLT 3, a remote node (RN) 5 and a plurality of ONUs 7. For simplicity, only a single ONU 7 is displayed. The WDM-PON uses a number n of optical channels, each optical channel using a dedicated optical channel bandwidth. A WDM port 9 of the OLT 3 is connected to a WDM port 11 of the RN 5 via a single optical fiber 13. Each of the ONUs 7 is connected to a channel port $14_i$ ($1 \le i \le n$) of the RN 5 at a remote port 15 by a single optical fiber 17.

The OLT comprises a number n of transceiver devices 19, each of which receives a first digital transmit signal $S1_{TXi}$ ($1 \le i \le n$), which is supplied to a respective local input port $21_i$ ($1 \le i \le n$) of the OLT 3. The first digital transmit signal $S1_{TXi}$ may e.g. be a 10 Gbit/s NRZ signal. Each transceiver device 19 further creates a first digital receive signal $S1_{RXi}$ ($1 \le i \le n$) and supplies this signal to a local output port $23_i$ ($1 \le i \le n$).

Of course, the first digital transmit signals $S1_{TXi}$ and the first digital receive signal $S1_{RXi}$ may be optical signals or electrical signals. The transceiver devices 19 may convert optical signals $S1_{TXi}$ into respective electrical signals, as generally electrical signals $S1_{TXi}$ are required to perform the signal processing within the transceiver devices 19. Likewise, signals $S1_{RXi}$, which are generally created as electrical signals, may be converted into respective optical signals, if required.

Each transceiver device 19 creates a first optical transmit signal or first optical channel transmit signal $S1_{TX,Chi}$ ($1 \le i \le n$) which transports the information included in the respective first digital signals $S1_{TXi}$ and supplies the signal $S1_{TX,Chi}$, via an output port of the transceiver device 19, to a dedicated channel port of an optical multiplexer device 25, which may be realized as arrayed waveguide grating (AWG). A combined first optical WDM transmit signal $S1_{TX,WDM}$ is output at a WDM port of the optical multiplexer device 25 and supplied to an optical circulator 27, which directs the first optical WDM transmit signal $S1_{TX,WDM}$ to the WDM port 9 of the OLT 3.

The WDM transmit signal $S1_{TX,WDM}$ is transmitted via the optical fiber 13 to the WDM port 11 of the RN 5, which demultiplexes the WDM transmit signal $S1_{TX,WDM}$ and outputs the optical channel transmit signals $S1_{TX,Chi}$ to the respective ONU at the respective channel port 14.

Each ONU 7, which may be regarded as transceiver device, receives the dedicated optical channel transmit signal $S1_{TX,Chi}$ at its remote port 15 and creates a second digital receive signal $S2_{RXi}$ ($1 \le i \le n$), which is output at a local output port $31_i$ ($1 \le i \le n$). Provided that no transmission errors occur and that the same coding is used, the second digital receive signal $S2_{RXi}$ is, of course, identical with the first digital transmit signal $S1_{TXi}$.

Further, each ONU 7 receives a second digital transmit signal $S2_{TXi}$ ($1 \le i \le n$) at a local input port 33 and uses this signal to create a second optical transmit signal or second optical channel transmit signal $S2_{TX,Chi}$ ($1 \le i \le n$) that is output at the remote port 15 of the ONU. The n second optical channel transmit signals $S2_{TX,Chi}$ ($1 \le i \le n$) are multiplexed by the RN 5 into a second optical WDM transmit signal $S2_{TX,WDM}$ and transmitted, via the WDM port 11 of the RN 5, to the WDM port 9 of the OLT 3. The circulator 27 directs the second optical WDM transmit signal $S2_{TX,WDM}$ to a WDM port of a demultiplexer device 35, which may be realized as an AWG. The demultiplexer device 35 demultiplexes the second optical WDM transmit signal $S2_{TX,WDM}$ into the individual second optical channel transmit signals $S2_{TX,Chi}$ and outputs these signals at dedicated channel ports, which are connected to respective input ports of the dedicated transceiver devices 19. Each transceiver device 19 extracts the information included within the respective second optical channel transmit signal $S2_{TX,Chi}$ and creates a corresponding first digital receive signal $S1_{RXi}$.

Of course, provided that no transmission errors occur and that the same coding is used, the first digital receive signal $S1_{RXi}$ is identical to the second digital transmit signal $S2_{TXi}$.

Further, the second digital transmit signals $S2_{TXi}$ and the second digital receive signal $S2_{RXi}$ may be optical signals or electrical signals. The ONUs 7 may convert optical signals $S2_{TXi}$ into respective electrical signals, as generally electrical signals are required in order to perform the signal processing within the ONUs. Signals $S2_{RXi}$, which are created as electrical signals, may be converted by the ONUs into respective optical signals, if required.

The RN 5 shown in FIG. 1, which merely comprises a demultiplexing device, is, of course, to be understood as an example, only. Any configuration may be used that performs the demultiplexing of the WDM transmit signal $S1_{TX,WDM}$ and the distribution of the individual optical channel transmit signals $S1_{TX,Chi}$ to the dedicated ONUs 7. Each connection between the output port and the input port of a transceiver device 19 and the remote port 15 of an ONU 7 represents an optical transmission link for bi-directionally transmitting the respective first and second optical channel transmit signals $S1_{TX,Chi}$ and $S2_{TX,Chi}$ in the corresponding first and second transmission directions. That is, the transmission method according to the invention is not restricted to WDM-PONs but may also be applied for arbitrary optical point-to-point connections.

Instead of single-fiber connections between the OLT 3, the RN 5 and the ONUs 7, also dual-fiber connections may be used without any impact on the nature of the optical signals used for the bi-directional data transmission. Of course, in case of dual-fiber connections, the RN 5 may comprise two separate demultiplexer/multiplexer devices which are used for the upstream and downstream transmission direction, respectively. As the downstream and upstream channel transmit signals $S1_{TX,Chi}$ and $S2_{TX,Chi}$ use the same optical channels also in case of a dual-fiber connection between the OLT 3 and the RN 5, a single demultiplexer/multiplexer device may be used in connection with suitable means, e.g. an optical circulator, adapted to combine and separate the transmission paths.

If dual-fiber connections are used for connecting the RN 5 and the ONUs 7, each ONU 7 may be connected via a first fiber to a dedicated channel port of a first one of two separate demultiplexer/multiplexer devices in the RN 5 and via a second fiber to a dedicated channel port of the second demultiplexer/multiplexer device in the RN 5. If a single demultiplexer/multiplexer device is provided in the RN 5, only, the necessary separating and combining of the downstream and upstream transmission paths may be achieved by suitable means like optical separators, wherein the channel port of the single demultiplexer/multiplexer device is coupled to a first common port of the path separation/combination means and each of the two connecting fibers guiding the downstream and upstream channel transmit signals $S1_{TX,Chi}$ and $S2_{TX,Chi}$ are connected to a downstream and an upstream port of the dedicated port of the path separation/combination means.

Figure 2:
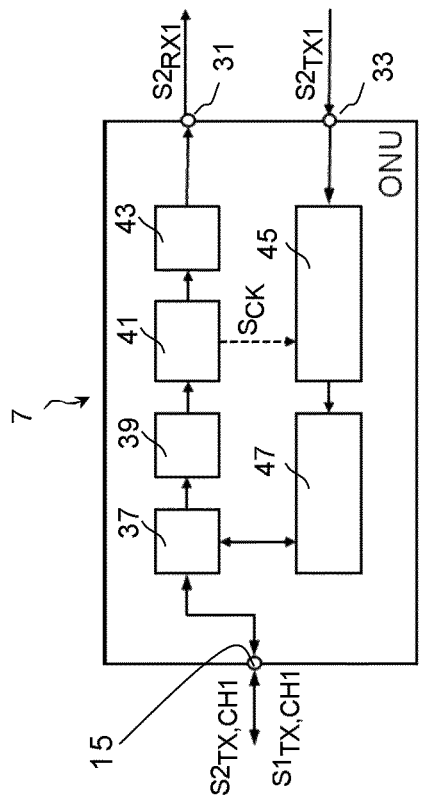
FIG. 2 is a schematic block diagram of an ONU applying the wavelength reuse method according to the invention using a reflective modulator device.

FIG. 2 shows a schematic diagram of a first embodiment of an ONU 7 that is configured to realize the method according to the invention described below. The ONU 7 comprises a directional coupler 37 adapted to split the optical channel transmit signals $S1_{TX,Chi}$ that is received at the remote port 15 with respect to its optical power. A first portion of the optical power represents an optical receive signal which is supplied to an opto-electrical converter device 39, e.g. a photodiode.

The electrical signal output by the opto-electrical conversion device 39 is supplied to a clock and data recovery (CDR) device 41 which extracts the information transported in the signal received and creates a corresponding electrical digital signal which is supplied to a low-pass filter 43 for pulse shaping purposes. The filtered electrical signal represents the second digital receive signal $S2_{RX1}$.

The CDR device 41 is adapted to recover the clock information of the digital signal received. The clock information is used to synchronize the sampling or receiving mechanism with the signal received in order to correctly detect the bit information within each symbol interval. As apparent from the description below, the optical channel transmit signals $S1_{TX,Chi}$ received at each ONU is a binary digital signal, at least with respect to the optical power of the signal. Thus, for detecting the bit information included in the signal received, the CDR device 41 may comprise a simple integrate-and-dump receiver. However, the CDR device 41 restricts the detection process to a selected section of the symbol interval, namely, to the first or second half of the symbol interval, as described below.

The CDR device 41 supplies the recovered clock signal $S_{CK}$ also to a driver circuit 45 which receives the second digital transmit signal $S2_{TXi}$ that is supplied to the local input port 33 of the ONU 7. The second digital transmit signal $S2_{TXi}$ may be a 10 Gbit/s binary signal including the information to be transmitted to the OLT 3 in the upstream direction.

The driver circuit 45 creates a second modulating signal $S2_{MODi}$ supplied to a reflective modulator device 47 such as a reflective semiconductor optical amplifier (RSOA), an injection-locked Fabry-Perot laser diode (IL-FP LD) or a reflective electro-absorption modulator with an integrated semiconductor optical amplifier (REAM-SOA). The reflective modulator device 47 is able to reflect or reflect and amplify the second signal portion of the first optical channel transmit signal $S1_{TX,CHi}$ which is split-off by the directional optical coupler 37 and supplied to an input/output port of the reflective modulator device 47. This branch-off signal serves for creating the second optical channel transmit signal $S2_{TX,CHi}$ which is modulated according to the modulating signal $S2_{MODi}$ and which has the same optical wavelength as the branch-off signal and thus as the first optical channel transmit signal $S1_{TX,CHi}$.

Figure 3:
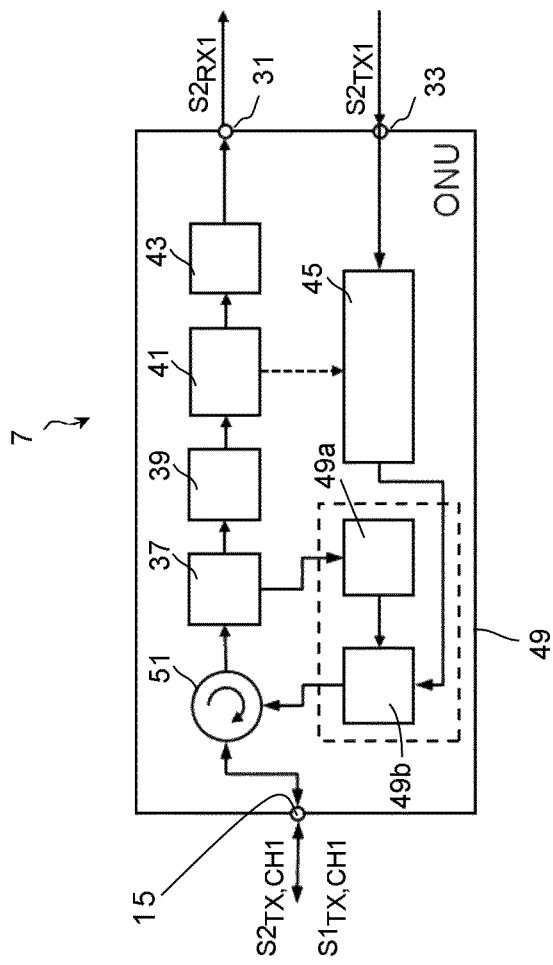
FIG. 3 is a schematic block diagram of an ONU applying the wavelength reuse method according to the invention using a non-reflective modulator device.

As shown in FIG. 3, in another embodiment of an ONU 7 realization for the invention, instead of a reflective modulator device a non-reflective modulator device 49 is used for creating the second optical channel transmit signal $S2_{TX,CHi}$. The non-reflective modulator device 49 may consist of an optical amplifier device 49a and an optical modulator device 49b, wherein these components are preferably integrated in a single unit or component. In this alternative, the optical branch-off signal is supplied to the optical amplifier device 49a which optically amplifies the branch-off signal created by the optical directional coupler and supplies the amplified signal to an optical modulator device 49b which modulates the amplified signal according to the modulating signal $S_{MODi}$ supplied by the driver circuit 45.

As the modulator device 49 is non-reflective, an optical circulator 51 is necessary for separating/combining the receive path comprising the components for creating the second digital receive signal $S2_{RX1}$ in the respective ONU 7 and the transmit path comprising the components for creating the second optical channel transmit signal $S2_{TX,CHi}$. As apparent from FIG. 3, the optical circulator 51 receives the first optical channel transmit signal $S1_{TX,Chi}$ and supplies it to the directional coupler 37. Further, the optical circulator 51 receives the second optical channel receive signal $S2_{TX,Chi}$ output by the non-reflective modulator device 49.

The signal processing which is necessary within the transceiver devices 19 of the OLT 3 and within the ONUs 7 in order to realize the data transmission method according to the invention will now be described in detail with reference to FIGS. 4 to 6. For this purpose, the communication and data processing necessary for a point-to-point connection between a selected transceiver device 19 within the OLT 3 and a dedicated ONU 7 is considered which uses a dedicated optical channel of the WDM-PON.

Figure 4:
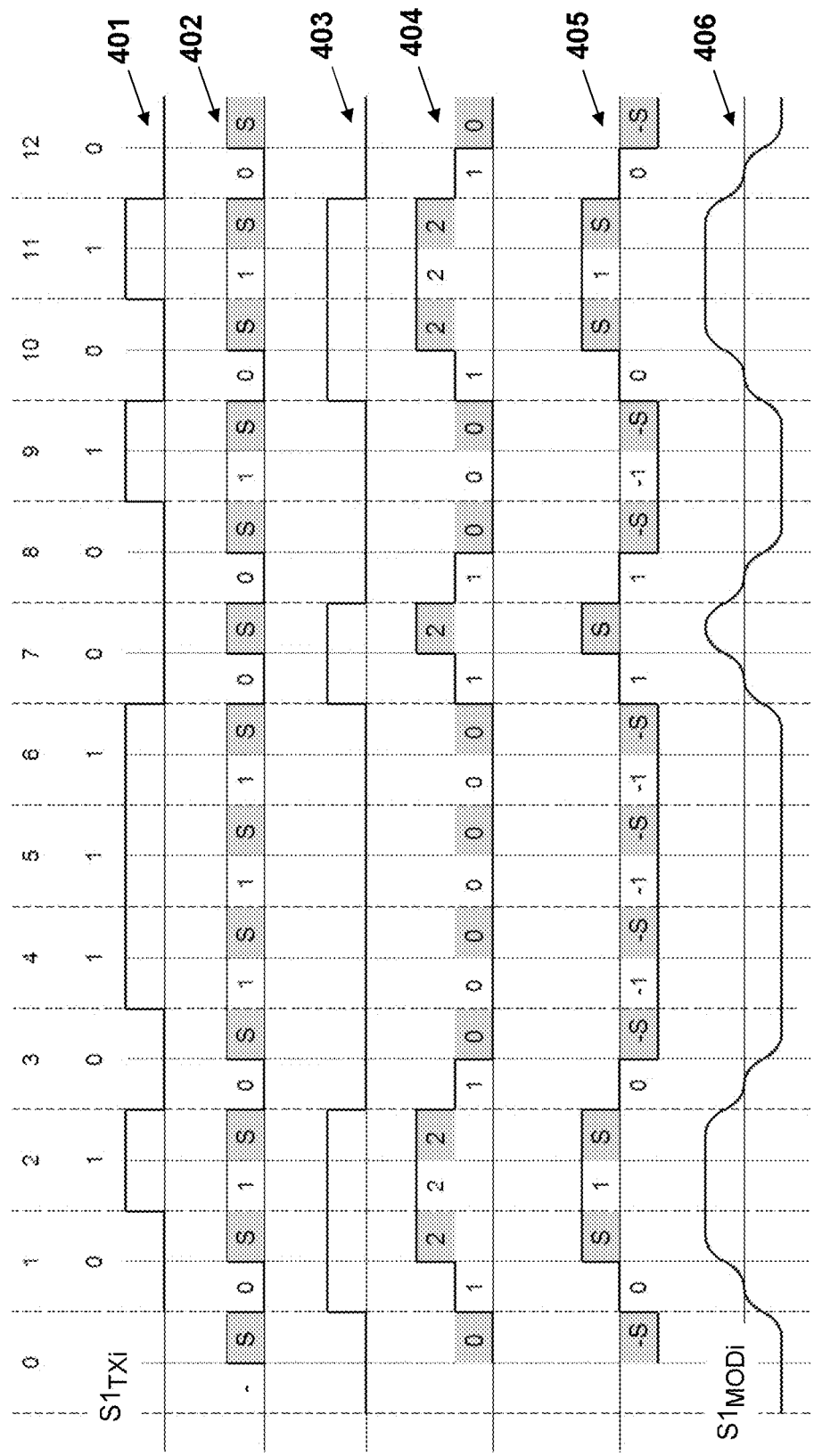
FIG. 4 is a schematic diagram showing various steps for converting a first NRZ digital signal into a duobinary coded modulating signal according to a first embodiment of the method according to the present invention.

As shown in FIG. 4, the selected transceiver device 19 receives the first digital transmit signal $S_{TXi}$, which may be a 10 Gbit binary NRZ signal represented by the curve shown at 401. In order to create a first optical channel transmit signal $S1_{TX,Chi}$ which can be reused to create the respective second optical channel transmit signal $S2_{TX,Chi}$ in the dedicated ONU, the bit interval of the NRZ signal $S1_{TXi}$ is divided into a first and a second section of equal length. Of course, if the signal $S1_{TXi}$ is not a binary NRZ signal, the transceiver device 19 may be configured to convert this signal into a respective (internal) NRZ signal. The transceiver device creates a bit-interleaved signal having twice the bit rate of the signal $S1_{TXi}$, wherein each first section of each bit interval is set to the value of the respective bit of the signal $S1_{TXi}$ and wherein each second section of each bit interval is set to logical 1 (or "high"). This (internal) signal is shown 402 in FIG. 4.

This signal is duobinary pre-coded, i.e. the bit value of the duobinary pre-coded signal at 403 in FIG. 4 is obtained by inverting the bit-interleaved signal shown at 402 and applying an exclusive or (EXOR) operation on the inverted signal and the resulting signal (i.e. the signal which results from the EXOR operation) which is delayed by one bit interval. For simplicity, the resulting pre-coded signal, which is shown at 403 in FIG. 4, reveals a logical 0 bit as start value for the EXOR operation. However, even if a logical 1 value is used as start value, this does not change the resulting optical first channel transmit signal $S_{TX,Chi}$. Merely, the phase of the E-vector of the electrical field is shifted by 180 degrees, which has no influence on the optical power of the signal that is detected in the ONU using a direct detection method.

As known, the pre-coding using inversion and EXOR operation of the delayed resulting signal is difficult to perform at high bit rates. Thus, an equivalent pre-coding method has been developed which applies an AND operation for the inverted input signal (the signal to be precoded) and a clock signal having the same bit rate, the resulting AND signal being supplied to a T flip-flop which realizes a modulo 2 counter. It has been shown that this simplified method which does not require a delay of the resulting signal by one bit interval leads to the same results (W. Kaiser et al, "Reduced Complexity Optical Duobinary 10 Gb/s Transmitter Setup Resulting in an Increased Transmission Distance", Photonics Technology Letters, August 2001, which is incorporated herein by reference).

In a next step, the transceiver device 19 duobinary encodes the pre-coded signal shown at 403 in FIG. 4 which results in the signal shown 404. The duobinary encoding, which includes an adding operation of the bit value of the actual bit interval and the bit value of the previous bit interval, leads to the ternary signal shown 404.

The signal processing including the pre-coding and encoding operations is performed in a signal processing device 52 comprised by a transmitter section of each transceiver device 19. The signal processing device 52 performs all operations necessary to create a first modulating signal $S1_{MODi}$ using the respective first transmit signal $S1_{TXi}$. The modulating signal $S1_{MODi}$ is supplied to an optical modulator device 53 of the transceiver device 19 or the transmitter section 19a of the transceiver device, respectively. Of course, the signal processing device 52 may be combined with a further signal processing device that is adapted to perform the necessary signal operations for the receiving of the second or upstream channel transmit signals $S2_{TX,Chi}$ by a receiver section 19b of the transceiver device 19.

In a last step, a symmetrical modulating signal ("symmetrical" here means symmetrical with respect to the extreme values of the signal) is created by subtracting a value of one from the asymmetrical ternary signal. This symmetrical ternary modulating signal is shown at 405 in FIG. 4. Finally, a low-pass filtering step may be applied in order to cancel high frequency noise from the signal, resulting in a filtered symmetrical duobinary pre-coded and encoded modulating signal $S1_{MODi}$ (see 406 in FIG. 4) that is used in the transceiver device 19 to create the respective first optical channel transmit signal $S1_{TX,Chi}$. For this purpose, the modulating signal $S1_{MODi}$ may be supplied to a suitable optical modulator device 53, e.g. a Mach-Zehnder modulator (MZM) or a dual electro-absorption modulator (dual EAM), which is driven between two transmission maxima including a 180-degree phase change.

Thus, the first optical channel transmit signal $S1_{TX,Chi}$ will have the same shape with respect to the envelope of the electrical field vector E as the modulating signal $S1_{MODi}$ shown at 406 in FIG. 4. Of course, the optical power of the first optical channel transmit signal $S1_{TX,Chi}$ reveals a shape of the envelope corresponding to the squared envelope of the E-vector of the signal $S1_{TX,Chi}$, which is essentially 0 for bit values 0 of the NRZ signal $S1_{TXi}$ and which is unequal to 0 in bit intervals that correspond to bit values 1 in the NRZ signal.

The method thus produces a first optical channel transmit signal $S1_{TX,Chi}$ which includes the bit information of the first transmit signal $S1_{TXi}$ in a first half section of the symbol interval of the first optical channel transmit signal $S1_{TX,Chi}$ and which includes an optical seeding power in the second half section of each symbol interval.

Of course, the roles of the first and second half sections can be changed. The receiving and modulating function carried out in the ONU 7 may be adopted in a suitable manner by adjusting the synchronization of the receiving and modulating processes.

It is not mandatory to use the duobinary pre-coding and encoding of the bit-interleaved signal shown at 402 in FIG. 4. This signal could also be directly used for creating a corresponding optical signal. However, the required bandwidth would increase by essentially the factor two. Additionally, the advantage of a duobinary pre-coded and encoded signal with respect to the reduced intersymbol interference and increased dispersion tolerance would be given up.

As apparent from FIG. 5, which again shows the signal sequences of 401, 402, 405, and 406 at 501 to 504, the transceiver device in an ONU can recover the information included in the first optical channel transmit signal $S1_{TX,Chi}$ by direct detection (i.e. evaluating the optical power of the signal received) applied to the first half section of each symbol interval.

It shall be noted that the term "symbol" interval is used with respect to the first and second optical channel transmit signal $S1_{TX,Chi}$ and $S2_{TX,Chi}$ as these signals are—at least with respect to the optical field vectors—ternary signals. The symbol interval is defined in such a way that each symbol interval includes the information of a single bit (or bit interval) of the respective NRZ signal $S1_{TXi}$.

In order to correctly detect the information included in the respective signal $S1_{TX,Chi}$ the CDR device 41 of an ONU recovers the clock of the NRZ signal $S1_{TXi}$ and thus the signal $S1_{TX,Chi}$. The CDR device 41, which includes a receiver device, uses this recovered clock to control the receiver device in such a way that only the respective (first) half section of each symbol interval is used for the signal detection. 505 in FIG. 5 shows this method by a curve indicating the time intervals or first half sections $I_1$ of the bit intervals $T_B$ in which the bit information of the NRZ signal is included.

Figure 5:
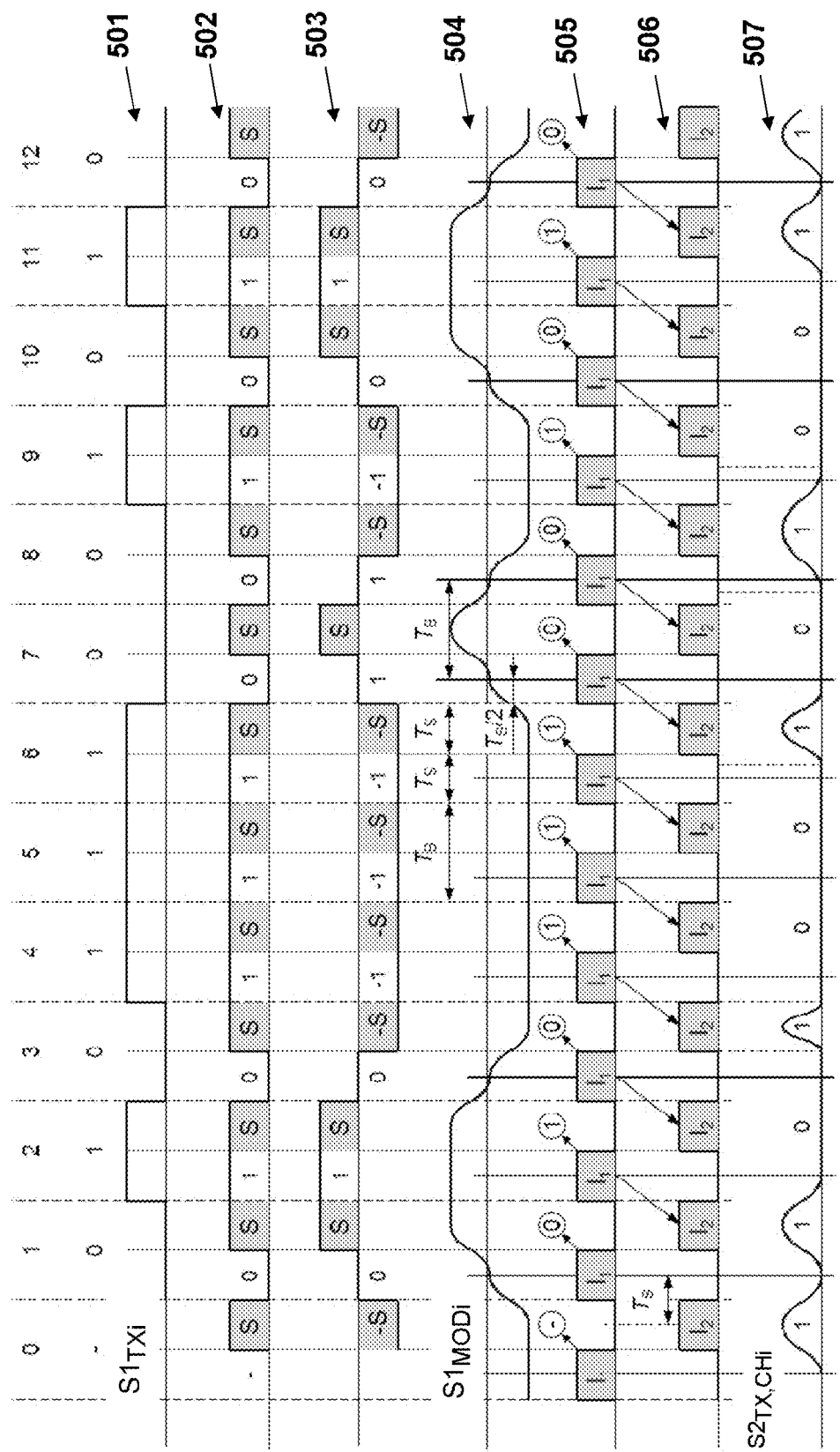
FIG. 5 is a diagram similar to FIG. 4 additionally showing the time relation between the first optical transmit signal received and the second optical transmit signal created at the second end of the transmission link.

506 in FIG. 5 illustrates the second half sections $I_2$ of each symbol interval $T_B$ which include the seeding power or seeding "half-bits". These sections of the symbol intervals of the first optical channel transmit signal $S1_{TX,Chi}$ received at an ONU can be used to create the second optical channel transmit signal $S2_{TX,Chi}$ as described above. As the (reflective or non-reflective) modulator device 47, 49 receives the recovered clock signal $S_{CK}$, the driver circuit 45 may use this signal to effect a modulation of the optically amplified branch-off signal within the second sections $I_2$ of the symbol interval $T_B$, only. This is shown at 507 in FIG. 5, illustrating the optical power of a second optical channel transmit signal $S2_{TX,Chi}$ which has been created using a first optical channel transmit signal $S1_{TX,Chi}$ that has been received at the ONU 7. As is apparent from the figure, the second optical channel transmit signal $S2_{TX,Chi}$ is created in such a way that the information included in the first half section of the symbol interval of the signal $S1_{TX,Chi}$ is deleted (the optical power in the second sections is set to zero) in order to reduce interference. This can be effected by using an RZ coding for the modulating signal $S2_{MODi}$. However, it would be possible to use any type of OOK in order to modulate the amplified branch-off signal in an ONU 7.

In order to detect the information included in the second optical channel transmit signal $S2_{TX,Chi}$ at the OLT 3, the respective transceiver device is also adapted to recover the clock from the signal received and to synchronize the receiver to the second half sections of the signal received for recovering the information included in these second sections of each symbol interval $T_B$.

Figure 6:
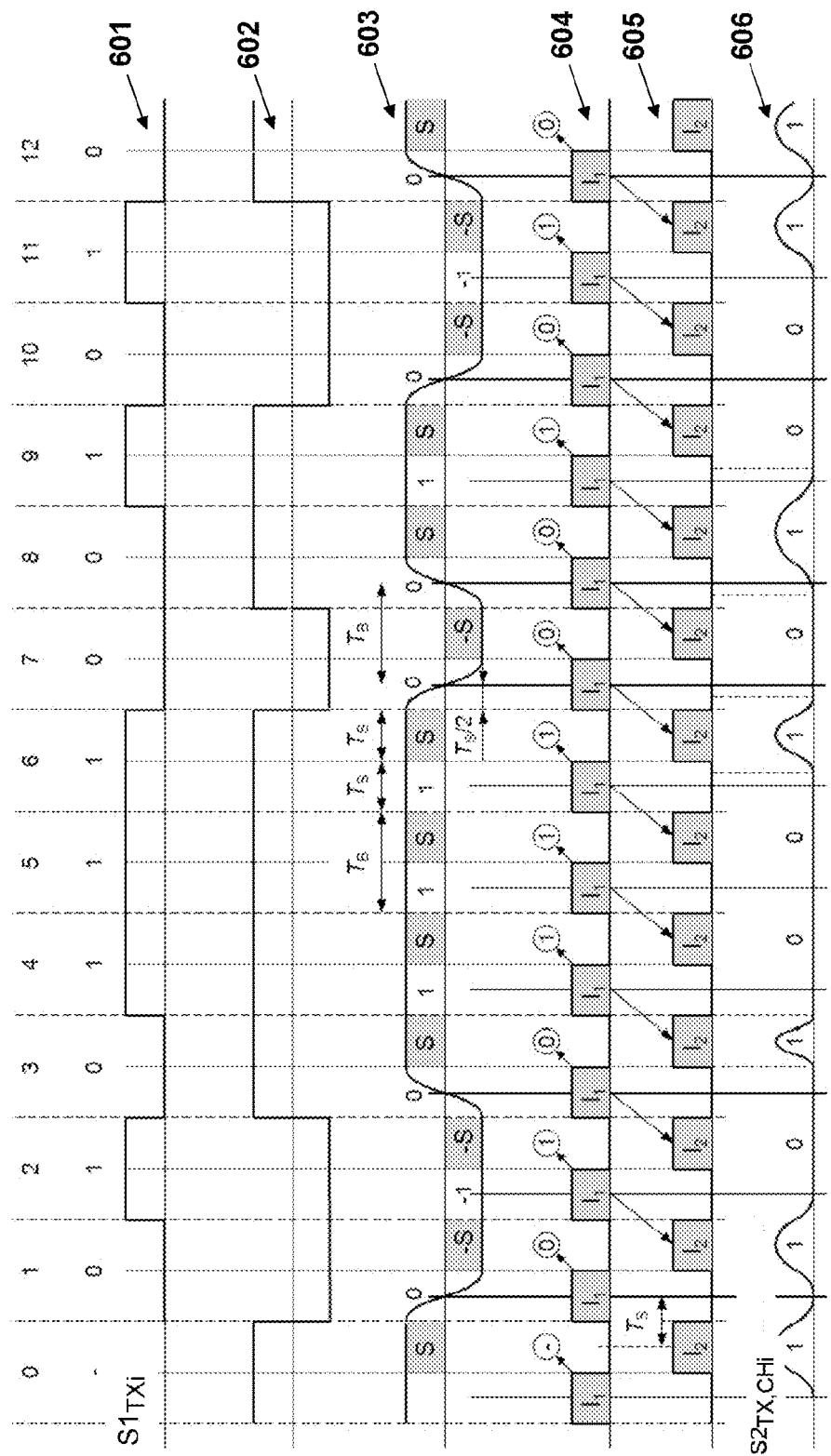
FIG. 6 is a schematic diagram similar to FIG. 5 for a second embodiment of the method according to the present invention.

FIG. 6 illustrates signal sequences in connection with a simplified method to create a duobinary pre-coded and encoded first optical channel transmit signal $S1_{TX,Chi}$ in the OLT 3. It is generally known that duobinary encoding can be effected by just low-pass filtering the pre-coded signal. This is apparent from a comparison of 403 and 406 in FIG. 4. A low-pass filtering applied to the pre-coded signal 403 leads to a similar signal revealing a given slope at the rising and trailing edges. The low-pass filter can be designed such that the filtered (symmetrical) signal crosses the time axis in essentially the same points as the filtered (symmetrical) signal 406 in FIG. 4. For creating a duobinary encoded signal having the same bit-rate as the pre-coded signal, a low-pass filter having a filter bandwidth of approximately 0.35 times the bit rate of the respective signal is used.

In an embodiment of a transceiver device 19 adapted to realize the data transmission method or creating of a first optical channel transmit signal $S1_{TX,Chi}$ as illustrated with the signals in FIG. 6, respectively, the following steps are performed: in a first step, the first transmit signal $S1_{TXi}$ (601), which is the respective NRZ signal, is duobinary pre-coded as described above. Although the signal sequence 601 is identical to the signal sequence at 401 in FIG. 4, the pre-coded signal shown at 602 in FIG. 6 (the signal sequence has already been made symmetrical with respect to the extreme values) is inverse as compared to the corresponding signal shown at 403. This is due to the fact that in the signal shown at 602 in FIG. 6 a value of logical 1 has been used as start value for the pre-coding process. As explained above, when using this signal as modulating signal $S1_{MODi}$ that is supplied to an optical modulator device like a MZM or a dual EAM, a ternary optical signal with respect to the electrical field vector envelope is created, which is a binary optical signal with respect to the optical power envelope. As a consequence, an inversion of the modulator signal leads to the identical optical signal as far as the optical power envelope is concerned.

The decisive difference between the well-known duobinary encoding using a low-pass filter and the present method of creating a bit-interleaved modulating signal $S1_{MODi}$ is that the low-pass filter must be designed in such a way that the zero-crossings of the filtered duobinary (ternary) modulating signal $S1_{MODi}$ are essentially in the center of the first half-section of the symbol interval (which is equal to the bit interval of the NRZ signal $S1_{TXi}$), i.e. the slope of the filtered duobinary modulating signal $S1_{MODi}$ is chosen such that the signal zero-crossings are essentially at a quarter of the bit or symbol interval (or at three quarters of the bit or symbol interval, if the second half section of the symbol interval is used for transmitting the information of the first transmit signal $S1_{TXi}$ and the seeding "half-bit" is included within the first half section). Generally, the low-pass filtering is effected using a low-pass filter that reveals a (3 dB) filter bandwidth of approximately 0.7 times the bit-rate of the NRZ first transmit signal $S1_{TXi}$. However, defining merely the filter bandwidth is not sufficient to characterize a suitable low-pass filter without defining the type and/or order of the filter.

As apparent from FIG. 6, the low-pass filtering of the pre-coded signal at 602 as described above is equivalent to the insertion of seeding "half-bits".

This encoding method does therefore change nothing as far as the signal processing in the ONUs 7 is concerned. Thus, the signal sequences shown at 604, 605, and 606 in FIG. 6, which illustrate the signal detection and the creation of the upstream (or second) optical channel transmit signal $S2_{TX,Chi}$, remain unchanged as compared to the identical signals shown at 505, 506, and 507 of FIG. 5.

The advantage of the filtered coding method as compared to the direct insertion of interleave bits according to the coding method illustrated with the signals in FIGS. 4 and 5, is that the coder device included in the signal processing device 52 of the transmitter section 19a of the transceiver device 19 must run at the bit-rate of the NRZ signal, only, whereas in the direct insertion method as described above with reference to FIGS. 4 and 5 the coder device must run at twice the bit-rate of the NRZ signal $S1_{TXi}$. The optical modulator devices 53 run in both cases at around the bandwidth of the NRZ signal due to the bandwidth reduction achieved by the duobinary coding.

Thus, the invention provides a data transmission method applying wavelength reuse of a downstream signal using an NRZ bit-interleaved signal in the downstream direction and any arbitrary amplitude modulation format to transmit the information included in an upstream digital signal in the upstream direction, wherein the signal portion according to the interleave bits included in the downstream signal, which is received and reused (amplified and modulated) at the second end of the transmission link to create a corresponding upstream signal, is used transport the information in the upstream direction. Especially NRZ or RZ pulse shaping may be applied to modulate the interleave bit portions of the wavelength reuse signal created at the second end of the transmission link.

The method can be implemented with or without optical duobinary coding of the optical downstream transmit signal. This method can easily and at low costs be implemented in suitable transceiver devices used at both ends of the transmission link. Especially when optical duobinary coding is applied, using a low-pass filter having an adjusted filter bandwidth to effect the insertion of interleaved seeding bits (which represent the part of the reused downstream signal that can be amplitude-modulated in order to include the upstream signal information) drastically reduces the effort and costs to implement the method in suitable transceiver devices at both ends of the transmission link.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

PARTIAL LIST OF REFERENCE SIGNS

1 WDM-PON, wavelength division multiplex passive optical network
3 OLT, optical line terminal
5 RN, remote node
7 ONU optical network unit
9 WDM port (OLT)
11 WDM port (RN)
13 optical filter
14$_i$ channel port (RN) ($1 \le i \le n$)
15 remote port (ONU)
17 optical fiber
19 transceiver device
19a transmitter section
19b receiver section
21$_i$ local input port ($1 \le i \le n$)
23$_i$ local output port ($1 \le i \le n$)
25 optical multiplexer device
27 optical circulator
29 WCM port (OLT)
31 local output port (ONU)
33 local input port (ONU)
35 demultiplexer device
37 directional coupler
39 opto-electrical converter device
41 CDR, clock and data recovery device
43 electrical low-pass filter
45 driver circuit
47 reflective modulator device
49 non-reflective modulator device
49a optical amplifier device
49b optical modulator device
51 optical dirculator
52 signal processing device
53 optical modulator device
n number of optical channels $S1_{TXi}$ first digital transmit signal (1≤i≤n)
$S2_{TXi}$ second digital transmit signal (1≤i≤n)
$S1_{RXi}$ first digital receive signal (1≤i≤n)
$S2_{RXi}$ second digital receive signal (1≤i≤n)
$S1_{TX,CHi}$ first optical channel transmit signal (1≤i≤n)
$S2_{TX,CHi}$ second optical channel transmit signal (1≤i≤n)
$S1_{TX,WDM}$ first WDM transmit signal (1≤i≤n)
$S2_{TX,WDM}$ second WDM transmit signal (1≤i≤n)
$S_{CK}$ clock signal
$S1_{MODi}$ first modulating signal (1≤i≤n)
$S2_{MODi}$ second modulating signal (1≤i≤n)

The invention claimed is:

1. A method for bi-directionally transmitting digital optical signals over an optical transmission link, the method including:
   (a) supplying a first optical transmit signal at a predetermined optical wavelength to a first end of the optical transmission link and transmitting the first optical transmit signal in a first transmission direction to a second end of the optical transmission link, the first optical transmit signal being created according to a non-return-to-zero first binary digital signal and comprising an optical bit-interleaved seeding signal having a symbol rate equal to a bit rate of the first binary digital signal and wherein the symbol interval of the optical bit-interleaved seeding signal is divided into two equally long sub-intervals, the bit information of the first binary digital signal being transported in a first of the two sub-intervals and the second sub-intervals being set to a seeding level with respect to optical power of the first optical transmit signal; and
   (b) supplying a second optical transmit signal at the predetermined optical wavelength to the second end of the optical transmission link and transmitting the second optical transmit signal in a second transmission direction to the first end of the optical transmission link, the second optical transmit signal being created by creating an optical wavelength reuse signal using the first optical transmit signal received at the second end of the optical transmission link, the optical wavelength reuse signal being modulated according to a second digital signal in such a way that the bit information of the second digital signal is included in the second sub-intervals of the symbol interval of the first optical transmit signal.

2. The method of claim 1 further including:
   (a) converting the first binary digital signal into a binary bit-interleaved digital signal having twice the bit rate of the first binary digital signal by dividing each bit interval into two equally long sub-intervals, setting one sub-interval to the signal value of the first binary digital signal and setting the respective other sub-interval to the logical 1 value of the first binary digital signal;
   (b) pre-coding the first binary digital signal and duobinary encoding the pre-coded binary bit-interleaved digital signal; and
   (c) modulating an optical light source having the predetermined optical wavelength using the pre-coded and encoded binary bit-interleaved digital signal as modulating signal.

3. The method of claim 2 wherein the duobinary optical bit-interleaved seeding signal is a ternary optical signal with respect to the electric field of the signal and a binary digital signal with respect to the optical power of the signal, and is created by using an optical modulator device which converts the modulating signal into the optical bit-interleaved seeding signal in such a way that the extreme values of the modulating signal correspond to +E and −E and the intermediate value of the modulating signal corresponds to 0, wherein +E, 0 and −E designates the amplitude of the electric vector of the optical bit-interleaved seeding signal.

4. The method of claim 1 further including:
   (a) pre-coding the first binary digital signal and duobinary encoding the pre-coded first binary digital signal;
   (b) low-pass filtering the pre-coded and duobinary encoded first binary digital signal in such a way that the filtered pre-coded and duobinary encoded first binary digital signal assumes in each transition between its extreme values a value which essentially equals the average value of the extreme values at points in time which essentially define a quarter of the bit interval; and
   (c) modulating an optical light source having the predetermined optical wavelength using the low-pass filtered pre-coded and encoded first binary digital signal as modulation signal.

5. The method of claim 4 wherein the duobinary optical bit-interleaved seeding signal is a ternary optical signal with respect to the electric field of the signal and a binary digital signal with respect to the optical power of the signal, and is created by using an optical modulator device which converts the modulating signal into the optical bit-interleaved seeding signal in such a way that the extreme values of the modulating signal correspond to +E and −E and the intermediate value of the modulating signal corresponds to 0, wherein +E, 0 and −E designates the amplitude of the electric vector of the optical bit-interleaved seeding signal.

6. The method claim 1 further including dividing the optical bit-interleaved seeding signal received at the second end of the transmission link, with respect to the optical power of the signal, into an optical receive signal and an optical branch-off signal, and receiving the first binary digital signal by detecting the optical power during the first of the two sub-intervals using an integrate-and-dump receiver.

7. The method of claim 6 further including applying a reflective modulator device to the optical branch-off signal to create the optical wavelength reuse signal.

8. The method of claim 1 wherein the second sub-intervals of the optical wavelength reuse signal are amplitude-modulated.

9. The method of claim 8 wherein the second digital signal is an NRZ or RZ signal.

10. An optical data transmission system for bi-directionally transmitting digital optical signals over an optical transmission link, the optical data transmission system including:
   (a) a first optical transceiver device configured to be connected to a first end of the optical transmission link and adapted to,
      (i) to create a first optical transmit signal at a predetermined optical wavelength and supply the first optical transmit signal to a first end of the optical transmission link for transmission in a first transmission direction to a second end of the optical transmission link, the first optical transmit signal being created according to a non-return-to-zero first binary digital signal and comprising an optical bit-interleaved seeding signal having a symbol rate equal to a bit rate of the first binary digital signal and wherein the symbol interval of the optical bit-interleaved seeding signal is divided into two equally long sub-intervals, the bit information of the first binary digital signal being transported in a first of the two sub-intervals and the second sub-intervals being set to a seeding level with respect to optical power of the first optical transmit signal, and
      (ii) to receive a second optical transmit signal at the predetermined optical wavelength which is supplied to the second end of the optical transmission link and transmitted in a second opposite transmission direction to the first end of the optical transmission link; and (b) a second optical transceiver device configured to be connected to the second end of the optical transmission link and adapted to,
  (i) receive the first optical transmit signal and to detect the information included in the first sub-intervals of the symbol interval thereof, and
  (ii) create a second optical transmit signal at the predetermined optical wavelength and supply the second optical transmit signal to the second end of the optical transmission link for transmission in a second transmission direction to the first end of the optical transmission link, the second optical transmit signal being created by creating an optical wavelength reuse signal using the first optical transmit signal received at the second end of the optical transmission link, the optical wavelength reuse signal being modulated according to a second digital signal in such a way that the bit information of the second digital signal is included in the second sub-intervals of the symbol interval of the first optical transmit signal.

11. The optical data transmission system of claim 10 wherein that the first optical transceiver device is configured to create the optical bit-interleaved seeding signal as an duobinary optical bit-interleaved seeding signal created by:
  (a) converting the first binary digital signal into a binary bit-interleaved digital signal having twice the bit rate of the first binary digital signal by dividing each bit interval into two equally long sub-intervals, setting one sub-interval to the signal value of the first binary digital signal and setting the respective other sub-interval to the logical 1 value of the first binary digital signal;
  (b) pre-coding the first binary digital signal and duobinary encoding the pre-coded binary bit-interleaved digital signal; and
  (c) modulating an optical light source having the predetermined optical wavelength using the pre-coded and encoded binary bit-interleaved digital signal as modulating signal.

12. The optical data transmission system of claim 10 wherein the first optical transceiver device is configured to create the optical bit-interleaved seeding signal as a duobinary optical bit-interleaved seeding signal created by:
  (a) pre-coding the first binary digital signal and duobinary encoding the pre-coded first binary digital signal;
  (b) low-pass filtering the pre-coded and encoded first binary digital signal in such a way that the filtered pre-coded and encoded first binary digital signal assumes in each transition between its extreme values a value which essentially equals the average value of the extreme values at times which essentially are equal to a quarter of the bit interval; and
  (c) modulating an optical light source having the predetermined optical wavelength using the low-pass filtered pre-coded and encoded first binary digital signal as modulating signal.

13. An optical transceiver device for an optical data transmission system for bi-directionally transmitting digital optical signals over an optical transmission link, the optical transceiver device including:

(a) a transmission arrangement configured to be connected to a first end of the optical transmission link and adapted to create a first optical transmit signal at a predetermined optical wavelength and supply the first optical transmit signal to the first end of the optical transmission link for transmission in a first transmission direction to a second end of the optical transmission link, the first optical transmit signal being created according to a non-return-to-zero first binary digital signal and comprising an optical bit-interleaved seeding signal having a symbol rate equal to a bit rate of the first binary digital signal and wherein the symbol interval of the optical bit-interleaved seeding signal is divided into two equally long sub-intervals, the bit information of the first binary digital signal being transported in a first of the two sub-intervals and the second sub-intervals being set to a seeding level with respect to optical power of the first optical transmit signal; and (b) a receiving arrangement configured to be connected to the first end of the optical transmission link and adapted to receive a second optical transmit signal at the predetermined optical wavelength which is supplied to the second end of the optical transmission link and transmitted in a second opposite transmission direction to the first end of the optical transmission link.

14. The optical transceiver device of claim 13 wherein the transmission arrangement is adapted to create the optical bit-interleaved seeding signal as a duobinary optical bit-interleaved seeding signal by:
  (a) converting the first binary digital signal into a binary bit-interleaved digital signal having twice the bit rate of the first binary digital signal by dividing each bit interval into two equally long sub-intervals, setting one sub-interval to the signal value of the first binary digital signal and setting the respective other sub-interval to the logical 1 value of the first binary digital signal;
  (b) pre-coding the first binary digital signal and duobinary encoding the pre-coded binary bit-interleaved digital signal; and
  (c) modulating an optical light source having the predetermined optical wavelength using the pre-coded and encoded binary bit-interleaved digital signal as modulating signal.

15. The optical transceiver device of claim 13 wherein the transmission arrangement is adapted to create the optical bit-interleaved seeding signal as a duobinary optical bit-interleaved seeding signal by:
  (a) pre-coding the first binary digital signal and duobinary encoding the pre-coded first binary digital signal;
  (b) low-pass filtering the pre-coded and encoded first binary digital signal in such a way that the filtered pre-coded and encoded first binary digital signal assumes in each transition between its extreme values a value which essentially equals the average value of the extreme values at times which essentially are equal to a quarter of the bit interval; and
  (c) modulating an optical light source having the predetermined optical wavelength using the low-pass filtered pre-coded and encoded first binary digital signal as modulating signal.

* * * * *